United States Patent [19]
Brister

[11] 3,827,282

[45] Aug. 6, 1974

[54] INSTALLATION, HYDROSTATIC TESTING, REPAIR, AND MODIFICATION OF LARGE DIAMETER FLUID TRANSMISSION LINES

[76] Inventor: Beryle D. Brister, 3902 Huntington, Amarillo, Tex. 79101

[22] Filed: July 19, 1971

[21] Appl. No.: 163,871

[52] U.S. Cl. .............................. 73/40.5 R, 138/97
[51] Int. Cl. ........................................... G01m 3/00
[58] Field of Search............... 73/40, 40.5 R; 61/0.5; 138/97, 99; 62/293

[56] References Cited
UNITED STATES PATENTS
3,041,850  7/1962  Nunn .................................... 62/293
3,505,820  4/1970  Draper et al........................ 73/40 X

*Primary Examiner*—Richard C. Queisser
*Assistant Examiner*—Denis E. Corr

[57] ABSTRACT

A pipeline, or a section of pipeline, is hydrostatically tested after assembly by pumping water into the pipeline behind a pig to completely fill a test section. A short length of the water in the pipeline is then frozen to form an ice plug at one or both ends of the test section. Additional water is then pumped into the test section to bring the pressure to a high value, typically at least 90 percent of the minimum specified yield strength of the pipe on one side of the ice plug. A lower pressure is established on the other side of the ice plug and is monitored to test the integrity of the ice plug. The test pressures and the ice plugs are maintained for at least 24 hours. If there is pressure loss, the leak is located and repaired. If there is no pressure loss, water is then pumped into the next test section and the procedure repeated. After all of the test sections have been tested, the water is then purged from the pipeline by pumping a dewatering pig through the pipeline, either with products or air. The method is also applicable to either test or repair pipelines which are in service by pumping a long slug of water through the line with the product. The water may then be frozen to provide ice plugs for testing, repairing or modifying the pipe.

18 Claims, 18 Drawing Figures

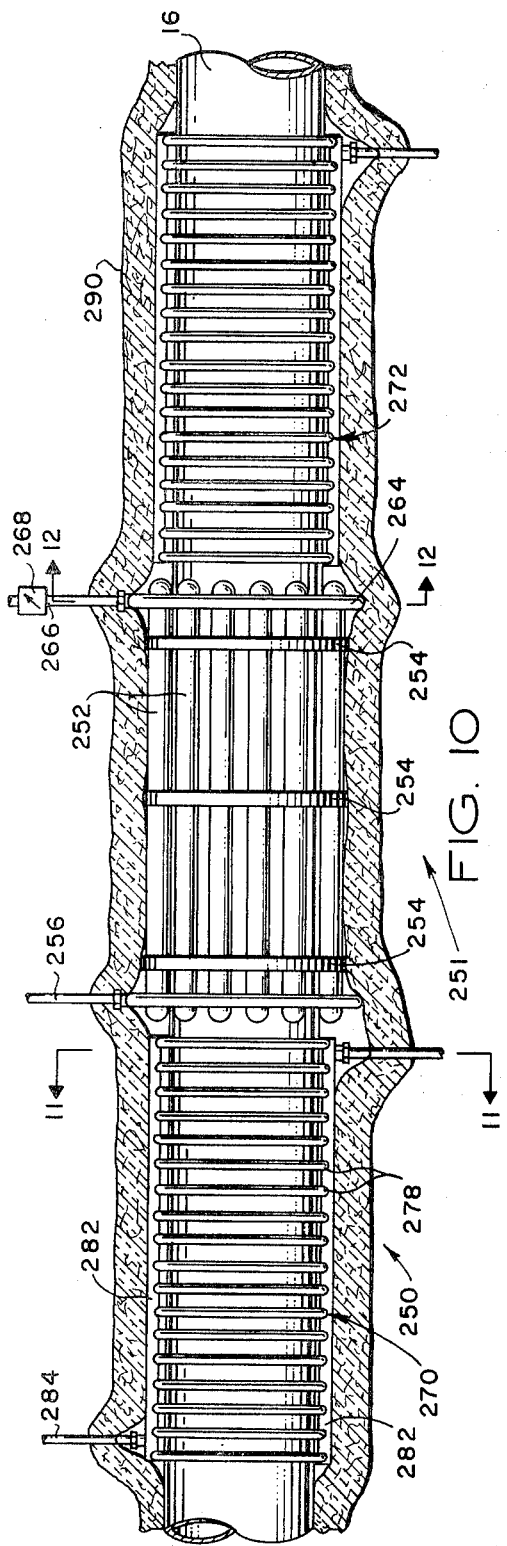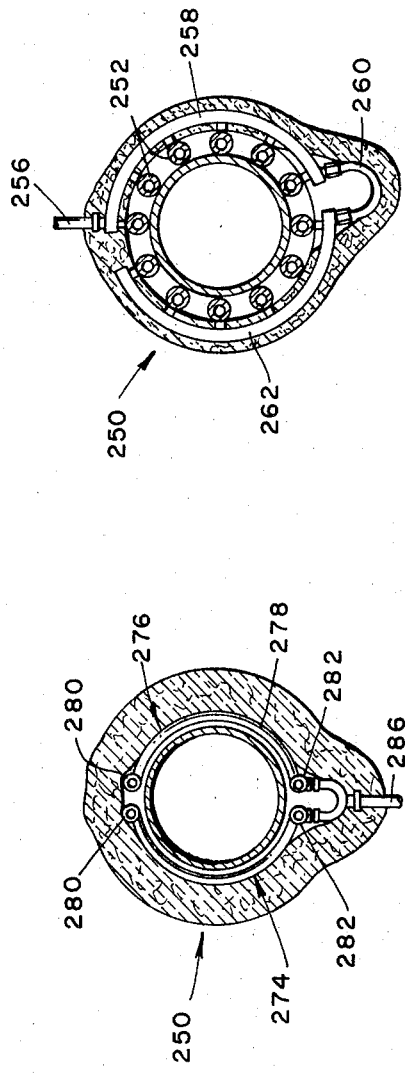

INSTALLATION, HYDROSTATIC TESTING, REPAIR, AND MODIFICATION OF LARGE DIAMETER FLUID TRANSMISSION LINES

This invention relates generally to the installation and maintenance of interstate fluid transmission lines for petroleum and other chemical products, and more specifically relates to method and apparatus for hydrostatically testing, modifying and repairing large diameter, high pressure pipelines.

Large diameter pipelines have been used for many years to transport crude oil, natural gas, gasoline, jet fuel and other petrochemical products over distances of hundreds, or even thousands of miles. These systems gather the crude oil and natural gas from the oil field and transport them to refineries and processing plants. The products from the refineries and processing plates are then transported over long distances to market.

These pipelines must be operated at high pressures in order to economically transmit large volumes of fluid. The high operating pressures represent a significant percentage of the maximum pressure which the pipe will withstand before rupture or leak, even if in perfect condition. Because of the nature of the products, rupture of a pipeline, or even relatively small leaks, can seriously damage the ecology and endanger human life. New pipelines may leak or rupture for a number of reasons, including faulty manufacture of the pipe, faulty weld joints, or damage to the pipe during transportation or installation. Pipelines which have been in use for some period of time are subject to leak or rupture due to corrosion, latent manufacturing defects or latent damage inflicted during installation.

Because of the serious consequences and relative high likelihood of ruptures and leaks, rigorous hydrostatic testing is employed to insure the integrity of each new pipeline installation. These hydrostatic testing procedures are exceedingly expensive and represent a very large proportion of the total cost of laying the pipeline. A typical pipeline is several hundred miles long and must therefore cross over hills, mountains, riberbeds, and highways. The pipeline is always divided into test sections, each of which is independently hydrostatically tested. Selection of the lengths and locations of the test sections is based upon changes in elevation, location of river crossings, location of pump stations, locations of launcher-receivers, and the like. In generaly, a test section will not exceed 20 or 30 miles in length simply because small leaks are sometimes very difficult to locate. Also, since the test pressures are often at least 90 percent of the minimum specified yield pressure of the pipe, changes in elevation within a test section would result in either the lower portion of the section being subjected to excessive test pressure, or the higher portion of the test section not being subjected to a sufficiently high pressure.

Each test section comprises a continuous length of pipe formed by welding pipe joints together, except where valves are bolted in to facilitate replacement. The welds are inspected by X-ray and then the pipe is wrapped, placed in a ditch and covered. The ends of the pipe of adjacent sections are left in overlapping relationship and a welded test manifold is installed at each end of the section. Each test manifold includes a short length of pipe with a welded cap, and at least one tee connection with a valve. The test manifold usually also provides interconnection between the overlapping ends of adjacent test sections, and means for launching and receiving inflated spherical pigs.

Each test section is then completely filled with water and all air pockets purged. This is often a time consuming and difficult task, and must be repeated for each test section. The pressure is then brought to a level often close to 2,000 psi and maintained for 24 hours. Any variation whatsoever in pressure not attributable to temperature changes indicates a leak. This necessitates locating the leak in the test section. If the pipe should rupture, the leak is, of course, easy to find. However, small leaks which do not result in the water coming to the surface can be very difficult to locate, particularly if the test section is many miles long. A test section often has small, high pressure leaks after a high pressure rupture has produced mechanical shock waves throughout the test section. In some instances, it is necessary to subdivide the test section into halves, then quarters, then eighths by cutting the pipe, installing test manifolds, and pressuring the subsections in order to locate the very small, high pressure leaks. After each subdivision is isolated by test manifolds, it must again be filled with water, the air purged, and the test repeated. When the leak is found, the pipe must be cut and spliced which results in the loss of all water in the section or subsection. Since very large volumes of water are required to fill large diameter pipe, the loss of the test water is very undesirable, particularly when no natural surface supply is at hand.

After adjacent test sections have been satisfactorily tested, the water is purged from the test section by a dewatering pig run and the section dried with a drying pig run. The caps are cut from the ends of the section, the adjacent sections are welded together, the welds are inspected and wrapped, and then the pipeline is buried.

The installation of test manifolds, the removal of the test manifolds and the splicing of the test sections requires very expensive installation crews and is a time consuming operation. These crews are usually maintained on stand-by during the test operation because if the test is successful they may immediately go to work. Also, each splicing operation is a local job requiring considerable time to set up on the job, then move from the job to the next location, and therefore is considerably more expensive than making a weld and laying the pipe as a continuous operation.

The hydrostatic testing of existing pipelines is even more expensive. The pipeline must be taken out of service for a substantial period of time. All products must be stripped from the pipeline. The pipeline is then dug up, and cut at the ends of the test sections, and test manifolds installed by welding at the ends of the test sections. The test procedures are then carried out as described above. After successful tests, the test manifolds are cut off, the sections are again welded together, the welds are inspected, and the pipe is wrapped and buried.

Repair or modification of pipelines that are in service also requires that the pipeline be taken out of service, and the product stripped from the pipeline. Only then can the pipeline be cut safely to install test manifolds or to make repairs or modifications such as installing valves or connecting parallel or feeder lines. The time required to strip and refill the line with the product is significant and represents a substantial cost.

The present invention is concerned with a method for installing and testing new pipelines, or for testing, repairing or modifying existing pipelines. The method of the present invention eliminates, or substantially reduces, the need for test manifolds in either new or existing pipelines. A new pipeline may be completely installed prior to hydrostatic testing, except for covering the pipe at the points between test sections, thus permitting the most efficient laying operation. Existing pipelines can be tested without cutting the pipeline, installing test manifolds, then removing the test manifolds and rewelding the line. The pipelines can be tested with a minimum out-of-service period. Existing pipelines can be modified or repaired without purging the line of products.

I have discovered that a large diameter pipeline designed to transport dangerous fluids over great distances at high pressures can be tested at pressures equal to the minimum rated yield strength of the pipe by filling a test section of the line with water, freezing a short length of the water by the external application of very low temperatures to form an ice plug, then raising the pressure of the water against the frozen water to the test pressure, typically on the order of 2,000 psi while maintaining the water frozen, and monitoring a lower pressure on the backside of the ice plug to detect a faulty ice plug. After a successful test, the ice is thawed and the water purged from the line. Surprisingly, the pipeline is not adversely affected by the frozen water, the low temperatures, and the very high pressure. Each frozen portion of the pipe can be subsequently tested by including it within a test section which is brought up to test pressures. Method and apparatus for freezing and maintaining an ice plug in a large diameter pipeline are also claimed as well as various specific methods.

The novel feature believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
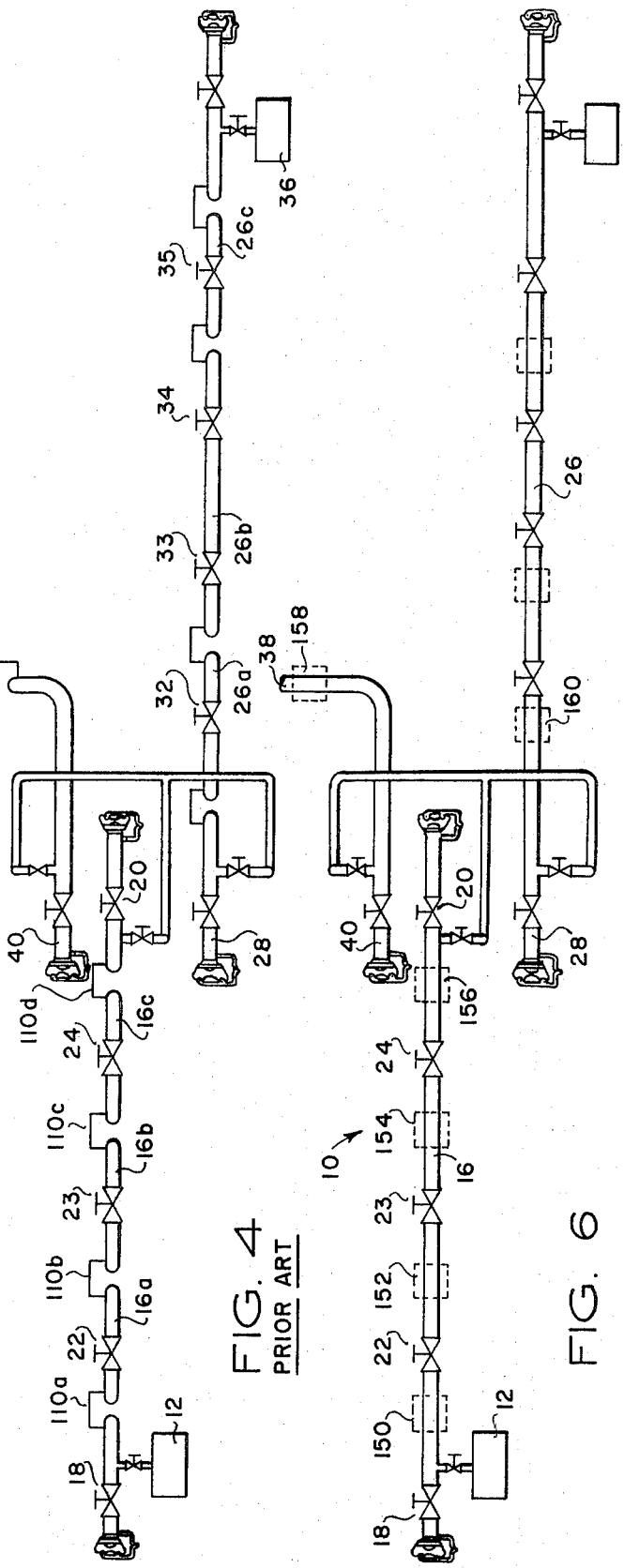
FIG. 1 is a schematic diagram of a typical pipeline system.
Figure 5:
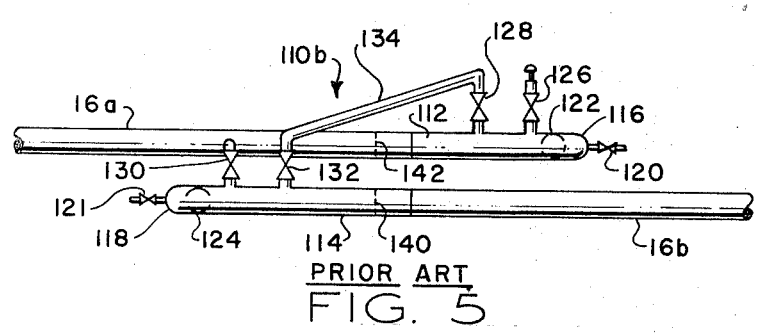
Figure 7:
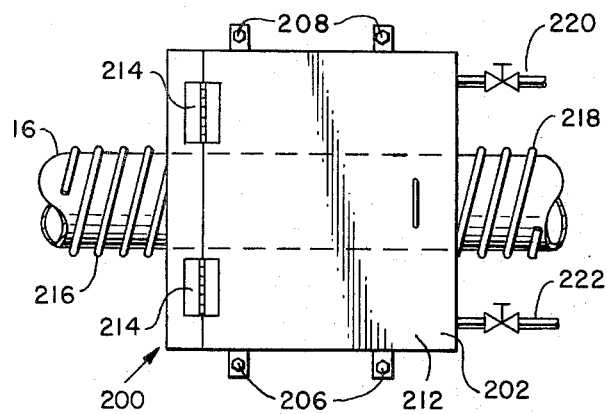
Figure 8:
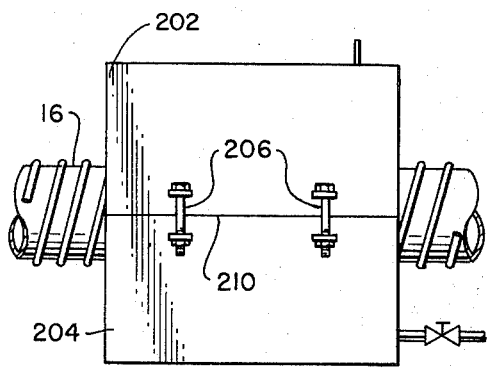
Figure 9:
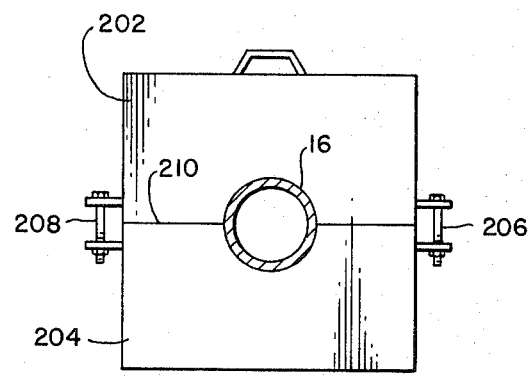
Figure 13:
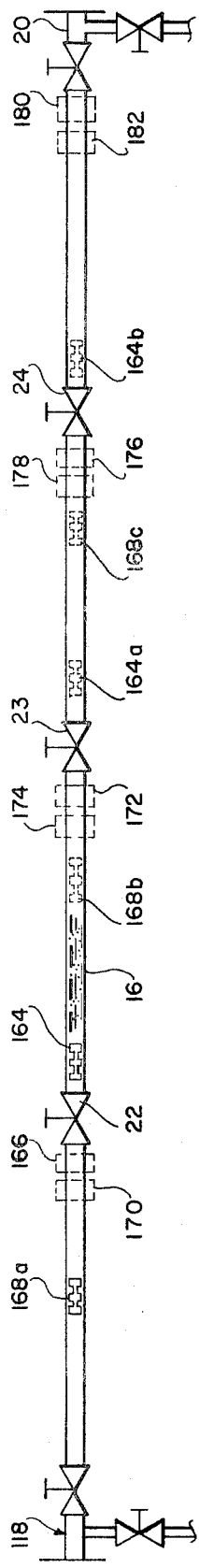
Figure 14:
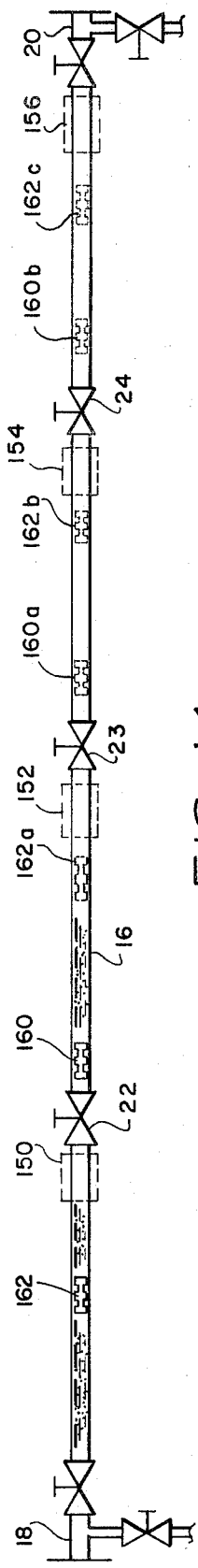
Figure 15:
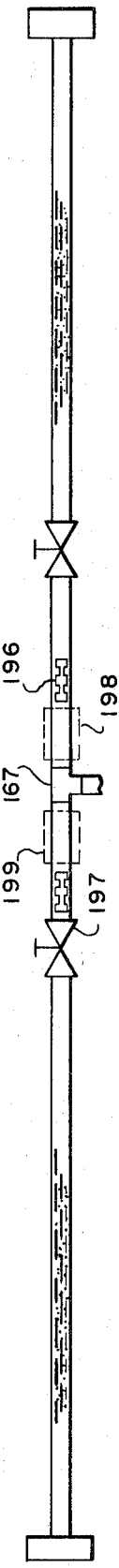
Figure 16:
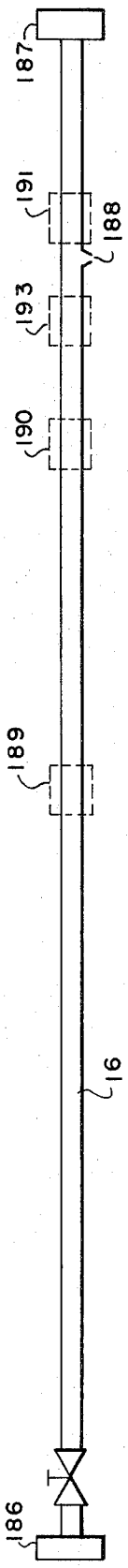
Figure 17B:
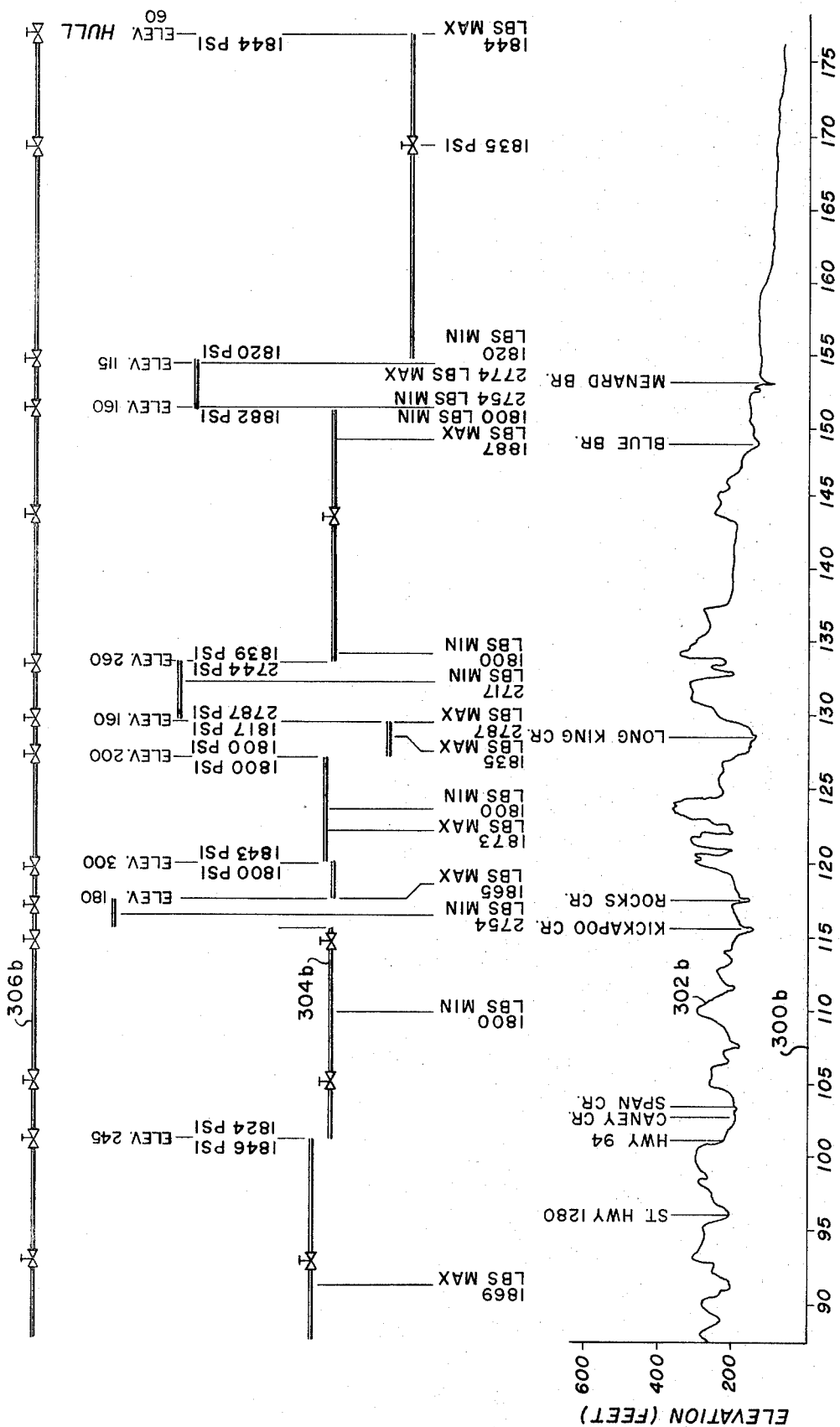
Figure 17A:
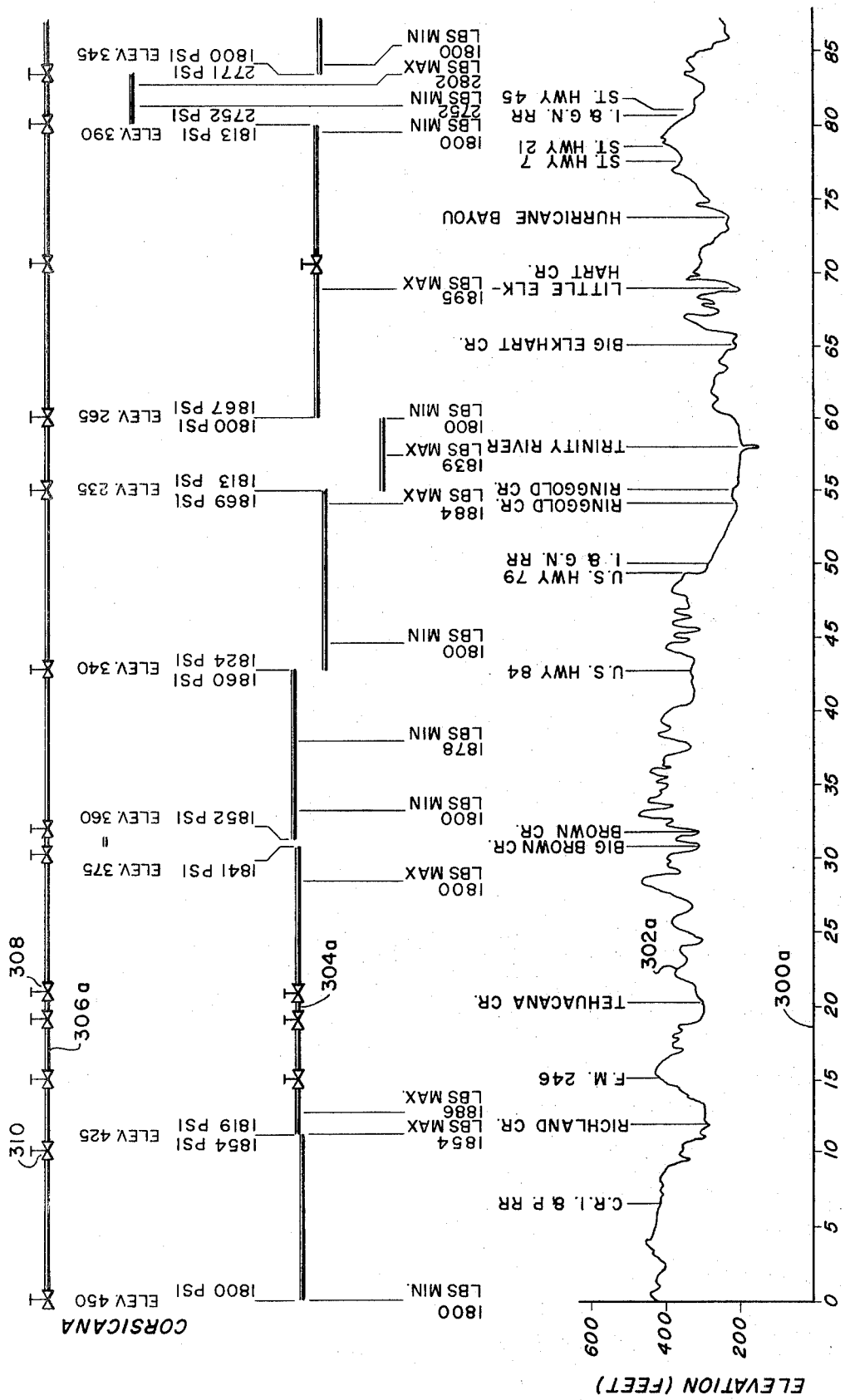

FIG. 4 schematically represents a prior art method of testing the pipeline system of FIG. 1;

FIG. 5 is a schematic diagram of a test manifold used in the prior art method of FIG. 4;

FIG. 6 is a schematic diagram illustrating the method of the present invention for testing the pipeline system of FIG. 1;

FIG. 7 is a top view of apparatus which may be used for carrying out the method illustrated in FIG. 6;

FIG. 8 is a side elevational view of the apparatus of FIG. 7;

FIG. 9 is an end elevation of the apparatus shown in FIG. 7;

FIG. 10 is a side elevation, partially in section, of an alternative apparatus which may be used in carrying the method illustrated in FIG. 6;

FIG. 11 is a sectional view taken substantially on lines 11–11 of FIG. 10;

FIG. 12 is a sectional view taken substantially on lines 12–12 of FIG. 10;

FIG. 13 is a schematic diagram illustrating another aspect of the present invention;

FIG. 14 is a schematic diagram illustrating still another aspect of the present invention;

FIG. 15 is a schematic diagram illustrating yet another aspect of the present invention;

FIG. 16 is a schematic diagram illustrating still another aspect of the present invention; and FIGS. 17a and 17b together illustrate a typical pipeline which may be installed and tested in accordance with the method of the present invention.

Referring now to the drawings, a simplified pipeline system is indicated generally by the reference numeral 10 in FIG. 1. The pipeline system 10 includes an originating station 12 for pumping the fluid products, typically crude oil, natural gas, or refined petroleum products such as gasoline, jet fuel or the like, into the pipeline. Fluids from the pump station 12 are passed through a valve 14 to a section of pipeline 16 having launcher-receivers 18 and 20, and mainline valves 22, 23 and 24. A second section of pipeline 26 has launcher-receivers 28 and 30 at each end and mainline valves 32–35. A receiving station represented at 36 may be another pump station, a refinery, a distribution terminal, or the like. A branch line 38 terminates in a launcher-receiver 40. The pipeline 16 may be from 4 to 36 inches in diameter and of welded construction. Additional launcher-receivers may be located along the lines 16 and 38 as needed.

Figure 3:
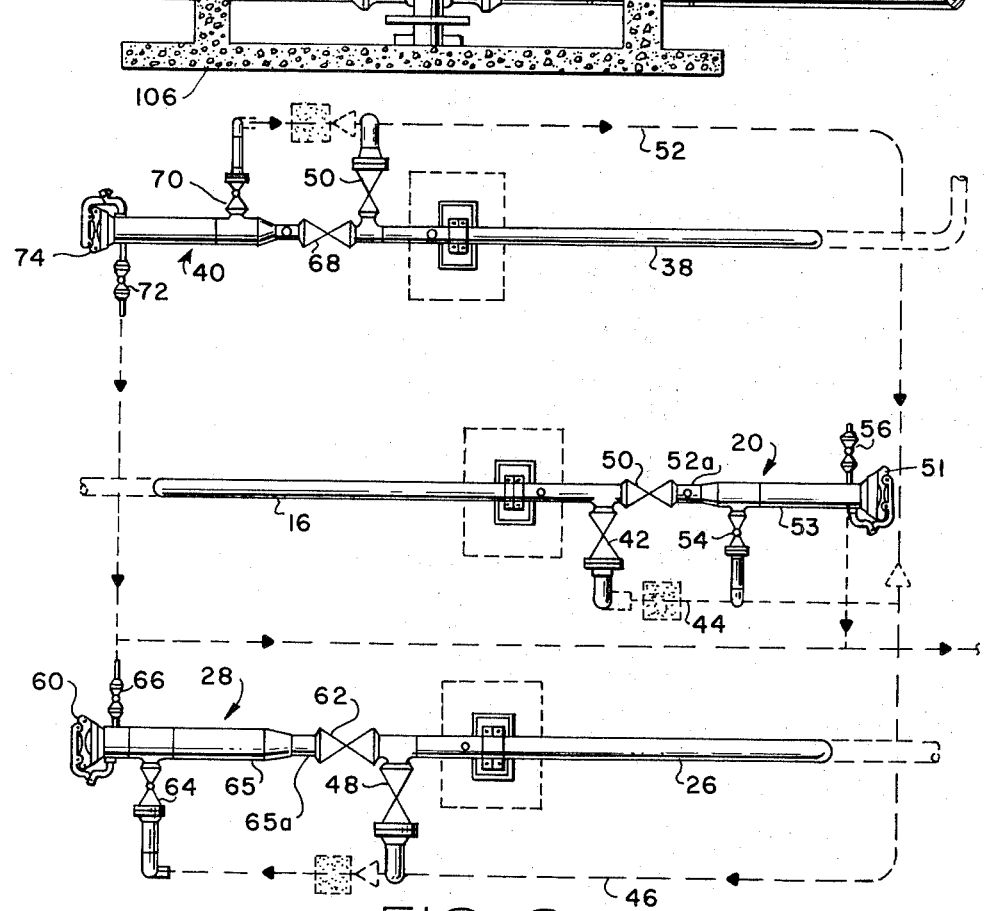
FIG. 3 is a simplified plan view of a system of launchers and receivers of the pipeline system illustrated in FIG. 1.

The three launcher-receivers 20, 28 and 40 are interconnected as illustrated in FIG. 3. Launcher-receivers 18 and 30 may be the same as the launcher-receivers 20 and 28, respectively. The line 16 is connected through a valve 42, lines 44 and 46, and valve 48 to line 26. Similarly, line 38 is connected through valve 50, lines 52 and 46, and valve 48 to line 26. Line 16 is also connected to line 38 by valve 42, lines 44 and 52, and valve 50. The launcher-receiver 20 includes a valve 50 through which a pig may pass into a launcher-receiver tube 53 which has a larger diameter than pipe 16. A quick-access closure means 51 permits the pig to be quickly and easily inserted or removed from the tube 53. A valve 54 connects the larger diameter portion of the tube 53 to the line 44. A valve 56 provides a means for venting pressure from the tube 53. Each of the other launcher-receivers is of identical construction. Thus, the launcher-receiver 28 has an end closure means 60, valve 62 for passing the pig, pressurizing valve 64, and bleed valve 66. The launcher-receiver 40 has valve 68 for passing the pig, valve 70 for pressurizing the tube, vent valve 72, and end closure means 74.

Launcher-receivers 20 and 40 will typically be used to receive pigs. Launcher-receiver 28 will typically be used to launch a pig. A pig is launched from the launcher-receiver 28 by closing valves 62 and 64, opening the end closure means 60 an inserting the pig into the throat 65a of the tube 65. The closure means 60 is then closed, valve 66 is closed, and valve 64 is open to pressure the tube 65. Then valve 48 is closed and valve 62 is opened to pass pressurized fluid into the tube 65 which will force the pig through the valve 62 and into the line 26.

To receive a pig in launcher-receiver 20, for example, valve 50 is opened, and either valve 54 or valve 56 is opened. Valve 42 may be closed or partially closed if necessary to provide pressure to force the pig through the valve 50 into tube 53. After the pig has entered the tube 53, the valves 50 and 54 are closed and valve 56 opened to vent the pressure. Then the closure means 51 can be opened to remove the pig.

Figure 2:
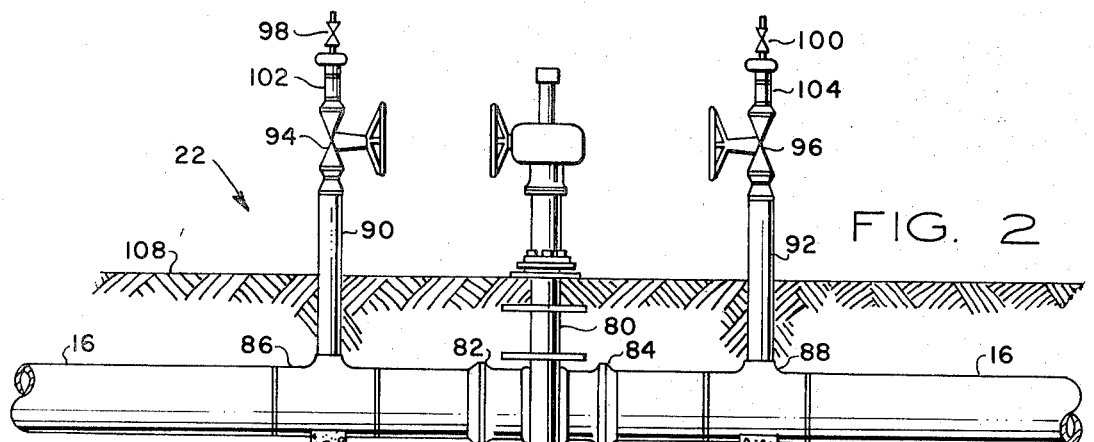
FIG. 2 is a simplified elevational view of a mainline valve of the pipeline system of FIG. 1.

A typical mainline valve, specifically mainline valve 22, is illustrated in FIG. 2. The mainline valve 22 comprises a full opening gate valve 80 which is connected in the line 16 by bolt flanges 82 and 84 which are welded in the line 16. A pair of reducing tees 86 and 88 are welded in the line 16 on either side of the valve 80. Risers 90 and 92 extend upwardly from the tees 86 and 88 and are closed by valves 94 and 96. Additional bleed valves 98 and 100 are mounted on the ends of nipples 102 and 104 in the valves 94 and are backed up by bull plugs when not in use. The tees 86 and 88 and the valve 80 are mounted on a concrete base 106 and most of the assembly is buried beneath the surface 108 of the soil.

The gathering system 10 of FIG. 1 may be several hundred miles in length. For example, line section 16 may be 8 inches in diameter and may start at an oil field in New Mexico. The line 38 may come from an oil field in West Texas and may also be 8 inches in diameter. The line 26 may be 10 or 12 inches in diameter, and may extend several hundred miles across the State of Texas to a refinery on the Gulf coast. The principal product carried by the system 10 may be crude oil. The normal operating pressures of the system might be as high as 700 or 1,500 psi. Because of the corrosive nature of crude oil, it becomes necessary to hydrostatically test the lines periodically in order to safely operate these lines at high pressures.

The prior art method for hydrostatically testing the system 10 is illustrated in FIGS. 4 and 6. To test the section of line 16, it is necessary to shut down station 12. The line 16 is then brought down to zero pressure. The products are then stripped from the line, typically by launching a pig from launcher 18 and pumping it through with a suitable fluid, such as water. This purges the line of dangerous fluids. Line 16 is then subdivided into selected test sections 16a, 16b and 16c, for example, by test manifolds 110a, 110b, 110c and 110d. The test manifolds 110a and 110b are preferably disposed very near the launcher-receivers 18 and 20 because these subsystems must be tested at a higher pressure. The length and locations of the test sections 16a–16c are selected because of topographical features such as changes in elevation, location of water supply, the locations of intermediate launcher-receivers, etc. The test sections typically have a maximum length of 15 to 25 miles simply to limit the amount of water which will be lost in the event of a rupture and to simply locate small underground leaks.

Each of the test manifolds 110a–110d is constructed substantially as illustrated in FIG. 5 which specifically illustrates test manifold 110b. The test manifold 110b is installed by uncovering the pipe 16 for a substantial distance on either side of the point where the test manifold is to be installed. The pipe is then cut and moved out of alignment to permit short lengths of pipe 112 and 114 to be welded to the sections 16a and 16b using standard pipeline welding procedures. Weld caps 116 and 118 close the ends of the sections 112 and 114. Prior to installation of the section 112, spherical pigs 122 and 124 may be included. Bleed valves 120 and 121 are provided in the caps 116 and 118. Valves 126 and 128 are provided on the risers from the manifold section 114. The valves 128 and 132 are interconnected with a jumper 134 so that fluid from test section 16a can be transferred to test section 16b. The valves 126 and 130 may be used to inject fluid into or remove fluid from the test sections 16a and 16b. The valves 120 and 121 may be used for any desired purpose, including launching and receiving the spherical inflated pigs 122 and 124. The test manifolds 110a–110d may all be installed simultaneously, or may be successively installed as the sections 16a–16c and the launcher-receiver sections 18 and 20 are successively tested.

When the section 16a, for example, is to be tested, the section is filled with water and all air purged. The purging procedure is sometimes difficult and is normally achieved by filling the section with water while pumping a spherical pig 122 against air pressure being bled from one of the valves. After the section has been completely filled with water, the pressure is raised by pumping additional water into the section to an intermediate test pressure to confirm that all the air has been removed and that the test manifolds are holding. Then the pressure of the water is raised to the full test pressure, typically in excess of 90 percent of the minimum rated yield strength of the pipe. The test pressures are usually in the range from 600 to 3,000 psi, with the larger sized pipe usually having lower pressures. The test pressure is maintained for a period of at least 24 hours. Any pressure drop whatsoever not attributable to changes in temperature indicates a leak.

If a leak is detected, the leak must be located and repaired. If a major rupture of the pipeline occurs, the leak can, of course, be located easily by inspection. However, small leaks are sometimes very difficult to find since the water does not come to the surface. These small leaks often occur only when the line is at the higher pressures. When the leak can not be located visually, the test section 16a must then be cut in half, an additional test manifold installed, and each of the halves again pressured to determine the half in which the leak is located. The half in which the leak is located may then be divided into quarter, then eighths, by cutting and installing additional manifolds to further isolate the leak.

Once the leak is located, the pipe is cut and repaired and the hydrostatic test procedure repeated until a successful test is achieved on each subsection. Each subtest section is then dewatered by propelling a spherical pig 122 through the line with compressed air. This is followed by running a drying pig through each section. Then the headers are removed and the original sections of the pipeline tied together. For example, in FIG. 5, the test header 110b may be cut along dotted line 140 and section 16a cut along line 142. The sections 16a and 16b can then be realigned and interconnected by a conventional weld.

This procedure is repeated for each of the sections 16a–16c of line 16, for each of the sections 26a–26c of line 26, and for the corresponding sections (not illustrated) of line 38, if desired. Additionally, all of the piping at the stations 12 and 36 have a launcher-receiver complex including launcher-receivers 20, 28 and 40 are individually tested, usually at substantially higher pressures than that used to test the lines.

Throughout the test procedures, it is necessary to have a complete tie-in crew including welders and helpers, the ditching, lifting and backfilling equipment necessary to handle the pipe, X-ray test crews for the welds. These equipment and personnel is in addition to the crew and equipment for conducting the hydrostatic tests. All of the welds must be X-rayed because this is the only test of the welds which join the sections after test manifolds have been removed. The cost of this operation amounts to tens of thousands of dollars per day and the testing of a single section may require several days, or even weeks if leaks occur.

In accordance with the present invention, the pipeline system 10 may be tested without cutting any of the lines or installing any test manifolds. This is achieved by launching a pig from the launcher-receiver 18 adjacent the station 12, behind the products using water as the propelling fluid. The entire line 16 may be filled with water until the pig is received in the launcher-receiver 20. Next, a short length of the water within the line 16 is frozen to form an ice plug at position 150.

The ice plug may be frozen using the apparatus indicated generally by the reference numeral 200 in FIGS. 7–9. The apparatus 200 comprises a box, indicated generally by the reference numeral 201, having halves 202 and 204 which may be mated around pipe 16 and secured in place by bolts 206 and 208. Any suitable fluid sealing means may be used along the seam 210 between the halves 202 and 204, and between the halves and the pipe 16 to provide a substantially liquid tight chamber. A lid 212 is mounted on the upper half 202 by hinges 214 to permit access to the interior of the box. Chill coils 216 and 218 are formed on each side of the box by wrapping copper around the pipe 16. The entire box 200 and the chill coils 216 and 218 are wrapped with a blanket of insulation (not illustrated).

In using the apparatus 200 to freeze an ice plug, the pipeline is uncovered at the point to be frozen only for a sufficient length to install the box 200 and the coils 216 and 218. The water within the pipe is maintained in a static condition. The protective coating on the pipe 16 is preferably removed in the area where the box 200 is to be installed. After the box 200 has been bolted around the pipe, the coil 216 and 218 wrapped around the pipe, and the entire installation is insulated, the coils 216 are then connected to a refrigeration unit which circulates a conventional refrigerant through the coils to begin cooling the water. Dry ice is crushed into pieces one inches to two inches in diameter and placed in a layer within the box 200 to a depth of about 8 inches. About 1 gallon of methanol is then poured over the ice. Additional 8 inch layers of dry ice are placed in the box 200 with corresponding amounts of methanol poured over each layer until the box is full. The dry ice is continuously stirred and packed around the pipe and a gallon of methanol added every half hour until a plug has been frozen. An ice plug can be frozen in an 8 inch pipeline in approximately 6 hours. Once it is believed that a plug has been frozen, the pressure on one side of the plug is raised slowly to test its integrity. Once the pressure has reached approximately 400 pounds, a good plug is normally assured. The methanol and dry ice are then maintained in the box as long as required to maintain the ice plug during the test. The temperatures within the box 200 may be as low as −190°F. during the freezing and test period.

In accordance with another aspect of the method of the present invention, the rate at which an ice plug is formed can be increased by injecting carbon dioxide or air through fittings 220 and 222 into the mixture of methanol and dry ice. Once the ice plug has been formed, the injection of $CO_2$ or air may be terminated.

An alternative apparatus for carrying out the method of the present invention is indicated generally by the reference numeral 250 in FIGS. 10–12. The apparatus 250 comprises a pressure section 251 having a series of elongated cylindrical pressure cylinders 252 which are interconnected into semi-circular halves by straps 254. The cylinders 252 may be filled with liquid nitrogen through fitting 256, header 258, jumper tube 260 and header 262. Gas may be vented from the cylinders 252 through similar headers 264 at the other ends of the tubes 252 and through fitting 266. A pressure relief valve 268 is provided to control the pressure within the vessels 252. A pair of chill coils 270 and 272 are disposed on either side of the pressure section 251. The chill coil 270 is comprised of halves 274 and 276 which may be of identical construction. Each half comprises a plurality of semi-circular tubes 278 interconnected by header tubes 280 and 282. A fitting 284 provides a fluid inlet to the upper header tube 280 and a fitting 286 provides return flow from the lower header tube 282. The chill coil 272 may be identical to the chill coil 270. An insulating blanket is wrapped around the pressure assembly 251 and the chill coils 270 and 272 after installation around the pipe 16.

The apparatus 250 is particularly useful in freezing an ice plug in very large diameter pipe, for example, pipe having a diameter of 36 inches. The apparatus 250 may be used to carry out the method of the present invention by circulating nitrogen gas, or other suitable cooling fluid, through the chill coils 270 and 272 until the pipeline 16 has been lowered to a temperature of about −100°F. Then liquid nitrogen is introduced into the pressure vessel assembly 251 through the fitting 256. The temperature of the section of the pipe under the pressure assembly 251 may be slowly reduced to about −320°F. The pressure relief valve 268 may be adjusted to control the pressure within the pressure vessels, and thus control the temperature. This is particularly useful during the test period after the ice plug has been formed and the very cold temperature is no longer required. The ice plug may be allowed to slowly thaw by slowly releasing the nitrogen from the pressure cylinders 252 and then slowly discontinuing circulation of the nitrogen gas through the coils 270 and 272.

The first ice plug in line 16 may be formed at position 150 in FIG. 6 in order to test the plumbing associated with the launcher-receiver 18 at station 12. Additional ice plugs may be formed in any lines (not illustrated) extending from the station 12 to provide complete isolation. Before the ice plug 150 is frozen, it is desirable to close mainline valve 22 and pressurize line 16 to several hundred pounds to assure that all air has been purged from the line at least as far as the valve 22. It will be recalled that in the present example, the entire line 16 has been filled with water by pumping a pig behind the products using water as the propelling fluid. For this reason, the line will normally be purged of air over its entire length.

If the relatively low preliminary pressure between mainline valve 22 and the injection pump indicates that the line is free of air, an ice plug is then frozen at position 150. The ice plug may be frozen while the line is under pressure so long as pressure remains the same to indicate that there are no leaks and that the water is in a static condition. When it is believed that the ice plug has been solidly formed, additional water may be pumped into the launcher-receiver section 18 to raise the pressure a few hundred pounds above the backside pressure. If the backside pressure does not increase as the water is pumped into the test section, this indicates that the ice plug is solidly frozen. Additional water is then pumped into the test section until the desired test pressure is achieved in the test section. The test pressure for above ground piping, such as the launcher-receiver 18, and the discharge plumbing associated with the station 12 will typically be from 2,000 psi to 2,800 psi, which is somewhat higher than the normal test pressures for the buried portions of the line 16.

After the test pressure is achieved, it is maintained for a prolonged period, typically 24 hours. Any variation in pressure whatsoever not attributable to changes in temperature indicates a leak. Non-temperature related pressure changes of even 1 pound results in an invalid test. It is important that the stable pressure of a few hundred pounds be established and maintained on the backside of the ice plug, and that this pressure be monitored at least at the end of the test period, and preferably throughout the test period. As mentioned, the backside pressure can be held by the mainline valve 22 since it is relatively low. Any rise in the backside of the pressure coupled with the loss of pressure in the test section indicates that the ice plug either slipped along the line, or that the ice plug leaked. A loss of pressure on the backside not coupled with the loss of pressure on the test side indicates that a leak has occurred between the ice plug 150 and the mainline valve 22, and does not invalidate an otherwise valid test of the station plumbing in launcher-receiver 18. In the event of a leak, the leak must be found, repaired, and a successful test completed before proceeding to the next test section.

After a successful test, the plug 150 is allowed to slowly thaw and a new plug is frozen at position 152. The back pressure for ice plug 152 can be established by closing mainline valve 23. After the plug 152 has been successfully frozen, additional water is pumped into the line from the station 12, or other water source, until the test pressure is achieved. The test pressure for the line will typically be from 600 to 2,000 psi, which is less than the pressure to which station plumbing will normally be tested. This test pressure usually represents from 90 to 110 percent of the minimum specified yield strength of the test section. The back pressure on the ice plug 152 can be maintained by the mainline valve 23 and monitored through the appropriate riser valve. This procedure is repeated with ice plugs successively frozen at positions 154 and 156 to completely test the line 16.

The foregoing method may be used where the line 16 is either level or slopes downhill so that no portion of the line is raised above a predetermined maximum value. In such a case, the resulting pressures in previously tested sections are progressively lower as the pressure is successively raised to 2,000 psi adjacent each ice plug. It is necessary to either measure the pressure at the lower elevations for each successive test, or to compensate for the pressure head acting on the lower elevations.

If the pipeline 16 is uphill from launcher-receiver 18 to the launcher-receiver 20, the same test procedure heretofore described may be repeated working from launcher-receiver 20 back to launcher-receiver 18.

In the event the pipeline 16 has upward and downward elevational changes over its length, as will be usually the case, it will normally be necessary to pressurize each test section individually, while maintaining the test section isolated from the adjacent test sections. In this event, ice plugs may be formed and maintained at each end of each test section. For example, ice plugs 150 and 152 can be simultaneously frozen and maintained in order to test the section of pipe 16 between these positions. Additional water may be pumped into the test section using either of the riser valves associated with the mainline valve 22. The test pressure can, of course, be monitored through the riser valves of the mainline valve 22. The back pressure on ice plug 150 can be maintained and monitored through the launcher-receiver 18. The back pressure on ice plug 152 can be maintained and monitored at mainline valve 23.

In the event the entire line 16 is sufficiently level, the entire line can be tested without any ice plugs between launcher-receivers 18 and 20. However, such a practice is not common because in the event of a major rupture, large volumes of water may be lost. Also, after repair of the rupture the entire line must again be filled with water and purged of air. Also, very small high pressure leaks can be difficult to locate in lines of considerable length since often the leaked water can not be observed from the ground. This type of leak is particularly prevalent after a major rupture because of mechanical shock waves induced in the line by the rupture. However, testing of an entire length of pipe is considerably more practical using the method of the present invention illustrated in FIG. 16.

FIG. 16 illustrates the method in accordance with this invention for locating a very small high pressure leak which can not be found easily by surface inspection. Assume that the line 16 has failed to hold pressure between test points 186 and 187 because of a leak 188. Assume also that water can be injected into the line for pressurization tests from either end and, thus that the pressure can be monitored at either end. The test points might be launcher-receivers 18 and 20, for example. An ice plug is formed at position 189 and the line 16 tested on both sides to determine which half of the line has the leak. The ice plug at position 189 would then be melted and a new ice plug formed at position 190 and the line again pressurized on both sides of the ice plug. This isolates the leak 188 as being in one-quarter of the original section. The ice plug then melted at 190 and a new ice plug formed at 191. This isolates the leak in a predetermined one-eighth of the original section. Finally, the ice plug is melted from position 191 and an ice plug formed at 193. This isolates the leak in one-sixteenth of the original test section. This procedure is repeated until the leak 188 is found by close inspection. Once the leak 188 has been located, freeze plugs may be formed on each side of the leak before the line is cut and the leaking section removed and replaced to minimize the loss of water. It will, however, be necessary to purge air from the line before further tests can be performed.

An alternative method for testing the section of line 16 is illustrated in FIG. 14. In this method, a first pig 160 is launched from the launcher-receiver 18 behind the products in the line using water. After a predetermined section of water has been pumped into the line 16, a second pig 162 is launched from the launcher-receiver 18 this time using products to propel the pig. The section of water is then pumped to straddle position 150 and an ice plug is frozen. Additional products may then be injected into the line 16 by way of the launcher-receiver 18 to raise the pressure against the ice plug at position 150 to the test level. Assuming the test is successful, additional products may be pumped into the line to move the section of water to straddle position 152 where pigs 160 and 162 will be at positions 160a and 162a. Then another ice plug is formed at 152 and the pressure again raised to the test level by pumping additional products into the line. This procedure is repeated by pumping the pigs to positions 160b and 162b, and finally 162c to form ice plugs at positions 154 and 156 to completely test the line 16. While the method illustrated in FIG. 14 requires a minimum amount of water and a minimum interruption of the use of the line 16, pressurizing the line with products is a significant disadvantage. When the products are not particularly dilitarious to the ecology in the event of a rupture, this method is satisfactory. Also, this method may be used where the products can be frozen to form the test plug, and are not dilitarious to the ecology, no water need be injected into the line 16. However, the latter method is not practical for most applications.

A preferred method of the present invention is illustrated in FIG. 13, which schematically illustrates line 16 of the system 10. A first pig 164 is launched from the launcher-receiver 18 behind the products using water to drive the pig. A first ice plug is frozen at position 166 and the pressure of the water raised to the test level for the test period. This tests the launcher-receiver and station piping. Additional water is then pumped into the line to fill the line for a predetermined length, which is at least as long as the maximum anticipated test section. Then a second pig 168 is launched behind the section of water using products to drive the pig until the first pig is at position 164a and the second pig is at position 168a.

Ice plugs are then frozen at positions 170 and 172. It will be noted that the previous ice plug position 166 is disposed between the new ice plugs 170 and 172. Water is then injected at the mainline valve 22 to raise the water pressure to the test level between ice plugs 170 and 172. This not only tests the next section of line 16, but also tests the site of ice plug 166 to insure that no damage was done to the pipe.

After a successful test has been achieved, the ice plugs at positions 170 and 172 are thawed, the pigs 164 and 168 are pumped to positions 164b and 168b by pumping additional products into the line, and new ice plugs are frozen at positions 174 and 176. Again it will be noted that the position 172 of the previous ice plug is between the new ice plugs 174 and 176. Water can then be injected by way of mainline valve 23 to achieve the test pressure.

After a satisfactory test is achieved, additional product is pumped into the line 16 to move the pig 164 into the launcher-receiver 20 and move the second pig to position 168c. Ice plugs 178 and 180 may then be frozen and water injected through mainline valve 24 to test the last section. Again it will be noted that site 176 of the previous freeze plug is between ice plugs 178 and 180.

Finally, an ice plug may be formed at position 182 to test the launcher-receiver 20. The method illustrated in FIG. 13 thus utilizes only a limited amount of water to carry out the test. As a result, the down time of the line 16 is reduced. Only water is within the high pressure test sections so that a rupture or leak does not result in significant damage to the ecology. Each ice plug site is tested after the ice plug is thawed to insure that the pipe has not been damaged or weakened by the pressure acting against the ice plug.

Still another method in accordance with the present invention is illustrated in FIG. 15. This method may be used to repair a known leak in a pipeline that is in service, or to modify a pipeline that is in service. In accordance with this aspect of the invention, a first pig 196 is launched behind the products using water. After a predetermined volume of water has been injected into the line, a second pig 197 is launched using the products. The section of water is then moved through the lines until the pigs 196 and 197 straddle the portion of the line which is to be repaired or modified. Then ice plugs are formed at positions 198 and 199 on each side of the point at which the line is to be cut. The line may then be cut in the section containing water without danger to personnel or to the ecology, and with minimum loss of water. The repair or modification, such as the installation of a mainline tee 167, can then be made. The ice plugs may then be melted and the flow of products quickly resumed. This procedure results in the line being out of service only for the time required to make the repair or modification.

After the line 16 has been tested using any one of the procedures heretofore described, the water from the line may be transferred to line 26 and/or line 38 by pumping additional products into the line 16 behind a pig. At this time, it will normally be desirable to test the launcher-receivers 20, 28 and 40 and the associated piping. This can be achieved by launching pigs from launcher-receivers 28 and 40 using water taken from launcher-receiver 20 as it is displaced by product pumped into line 16 at launcher-receiver 18. After the pigs have been pumped a short distance into lines 26 and 38, ice plugs may be formed at positions 156, 158 and 160, and the hydrostatic test procedures carried out as heretofore described. Lines 26 and 38 may then be also tested using any appropriate procedure heretofore described.

Another aspect of the invention is illustrated in FIGS. 17a and 17b. These figures taken together illustrate the proposed layout of an actual 12 inch pipeline from Corsicana, Texas, to Hull, Tex. The base line represents distance along the line in miles. The line is 175 miles in length. Lines 302a and 302b represents the elevation of the pipeline in feet at each point along its length. The major river, railroad and highway crossings are also indicated on line 302a–302b. Line 304a and 304b illustrate the individual sections which are to be tested separately because of changes in elevation, and because of different wall thicknesses of pipe used at river crossings and the like. The elevations and test pressures are also indicated. Lines 306a and 306b illustrate the completed pipeline and the location of mainline valves. Intermediate launcher-receiver stations or pump stations are not illustrated.

Using conventional prior art construction techniques, each test section would be fabricated and buried, but the test sections would not be interconnected. A test manifold of the type illustrated in FIG. 5 would be used at each end of each test section. Each test section would then be tested to the pressures indicated in FIGS. 17a and 17b using standard test procedures. After successful tests, the test manifolds would be cut from the lines and the sections welded together. After the welds had been X-rayed, the spliced line would be lowered into the ditch and covered. The expense of a conventional test method typically constitutes a substantial percentage of the total cost of laying the pipeline.

In accordance with the method of the present invention, the pipeline could be completely assembled, or at least a substantial number of the test sections assembled, and the line buried prior to hydrostatic testing. The successive test sections could then be tested using any of the applicable procedures heretofore described.

For example, using the method of the present invention, the pipeline could be laid continuously beginning at the Corsicana terminal and working toward the Hull terminal. The line could be filled with water from any suitable source, such as one of the rivers crossed or an adjacent lake. The line is filled with water for a length greater than any test section plus the distance at least to a mainline valve on each side of the test section for holding a back pressure. The length of water would preferably be positioned between two inflated spherical pigs to maintain the length of water free of air. Air pressure may be used to hold each of the pigs against the water and to move the water from one test section to the next. Of course, the river crossings can be pretested before installation using conventional test headers. Then the river crossing section can again be tested after the sections are tied in with the adjacent sections using the method of the present invention.

Thus, using the method of the present invention, the pipeline could be continuously laid by the most efficient line laying procedures. No special manifold equipment, manifold installing crews, or tie-in crews would be required. Only a three or four man test crew would be required. When the line has reached its terminal position at Hull, the test procedure could be completed except for the final section. By pumping the section of water through the continuous length of pipe using a dewatering pig, no further dewatering would be required. Of course, a drying pig could be pumped behind the dewatering pig at any time. If products were already available, products could be used to pump the dewatering pig through the line as the is laid. In this manner, the line can deliver products immediately upon completion.

In some instances, a source of water to fill the pipeline can be a significant problem because of the very large volume of water required to test a large diameter pipeline. For this reason, it may often be necessary to divide a pipeline at a water source and test the line in each direction from the source. It is also sometimes difficult to dispose of the large volume of water when the test has been completed. Thus, it may be necessary, or desirable, in some instances to install pig launcher-receivers at a water source, such as a river or lake. This may comprise temporary test manifolds or permanent launcher-receivers. For example, when laying the pipeline illustrated in FIGS. 17a and 17b, it may be desirable to use either temporary test manifolds or permanent launcher-receiver stations could be installed at the Trinity River for initial and future test purposes. The water might then be pumped into the line toward Corsicana behind a spherical inflated pig launched from either the test manifold or from the permanently installed launcher-receiver. The line could be filled with water, or a section of water could be pumped to Corsicana using leading and trailing pigs and air pressure. The test procedures heretofore described can be carried out either as the water is pumped up the line to Corsicana, or as the water was returned to the river. In either case, a dewatering pig could then be run from the Corsicana end of the line back to the pig receiver at the Trinity River. This water could be either emptied into the Trinity River or could continue to be pumped down the line to the Hull terminal. The portion of the line from the Trinity River down to the Hull terminal could be tested in the same manner. In almost every case, however, it is necessary to run a dewatering pig to purge the line of water.

From the foregoing description of preferred embodiments of the invention, those skilled in the art will appreciate that a highly improved method has been described for hydrostatically testing existing or new pipelines, for locating leaks in pipelines, and for modifying or repairing pipelines in service. The method is far less expensive than previous hydrostatic testing methods. Although the method has been described as utilizing ice plugs exclusively for establishing a test pressure, other methods for containing the test pressure can be employed. For example, in some instances it may be advantageous to use a back pressured mainline valve to contain the test pressure. For example, if a test pressure of 2,000 psi is to be established in a test section, and the mainline valve will safely hold 1,000 psi, then the mainline valve may be used by establishing a back pressure on the valve of, for example, 1,200 pounds. The back pressure may in turn be held by a second back pressured mainline valve. A third mainline valve can hold the back pressure on the second mainline valve where required. In this situation, it may still be desirable to use an ice plug to retain the pressure at the other end of the test section. In some instances, test sections may be tested using back pressured mainline valves at each end of the test section. In such a case, high pressure leaks may still be located using the method described in connection with FIG. 16.

Although preferred embodiments of the invention have been described in detail, it is to be understood that various changes, substitutions and alterations can be made therein without departing from the spirit and scope of the invention as defined by the appended claims.

What is claimed is:

1. The method for hydrostatically testing a pipeline system for transporting ecology degrading or dangerous fluid products over substantial distances which comprises:

freezing a short length of water in the pipeline to form an ice plug, maintaining a relatively high test pressure on one side of the ice plug while maintaining a lower back pressure on the other side of the ice plug for a test period, and monitoring the test pressure and the back pressure during the test period to detect any leaks in the test section or in the ice plug.

2. The method of claim 1 wherein
two ice plugs are formed in the pipeline, and
there is a test pressure between the ice plugs and a back pressure on the other side of each ice plug.

3. The method of claim 1 wherein:
the pipeline is tested in a plurality of successive test sections, and
the test sections overlap so that the position of each ice plug is included in another test section.

4. The method of claim 2 wherein:
the two ice plugs are disposed on opposite sides of a mainline valve, and
the test pressure is established by pumping additional water through a fixture of the mainline valve.

5. The method of claim 1 wherein
the line is divided into at least first and second test sections having higher and lower maximum permissible test pressures, respectively, when in fluid communication,
an ice plug is used to isolate the second test section from the first test section while the first test section is being tested to the higher pressure, and
the first and second test sections are in fluid communication while the second test section is being tested.

6. The method for hydrostatically testing a pipeline system for transporting ecology degrading or dangerous fluid products over substantial distances which comprises:
filling at least a test section of the pipeline with water from a source,
freezing a short length of the water adjacent at least one end of the test section to form an ice plug,
pumping additional water into the test section to increase the pressure to a predetermined test level which is a major percentage of the minimum yield pressure of the pipe and holding the test level for a test period, and
purging the water from the test section upon completion of a successful test.

7. The method of claim 6 wherein back pressure is maintained against the other side of the ice plug during the test period and the back pressure is also monitored.

8. The method of claim 6 wherein:
water is pumped into the test section from a water source at one end of the test section and the water is purged from the test section back to the water source by forcing a pig through the section with fluid pumped into the opposite end of the test section.

9. The method of claim 8 wherein the water is pumped to successive test sections of a completed pipeline.

10. The method for hydrostatically testing an operational pipeline which is transporting ecology degrading or dangerous fluid products over substantial distances which comprises
pumping a substantial volume of water into the pipeline to form a water slug filling a length of the pipeline,
transferring the water slug through the pipeline by pumping additional fluid into the pipeline,
discontinuing the pumping of the fluids into the pipeline when the water slug has reached a predetermined position,
freezing a length of the water in the pipeline to form a pressure resistant ice plug, and
pumping additional liquid into the pipeline to raise the water pressure against the plug to a predetermined value that is a major portion of the minimum yield pressure of the pipe and holding the pressure at the predetermined value for at least a predetermined period of time while maintaining the ice plug frozen.

11. The method of claim 10 wherein:
the water is frozen at two spaced points to form two spaced ice plugs, and
the additional liquid pumped into the pipeline to raise the pressure is water pumped into the pipeline between the two pressure plugs.

12. The method of claim 10 wherein
the additional liquid pumped into the pipeline to raise the pressure is additional products pumped into the pipeline from the source of products.

13. The method of claim 10 wherein the additional fluid pumped into the pipeline for transferring the water slug is fluid products.

14. The method of claim 10 wherein the additional fluid pumped into the pipeline for transferring the water slug is water.

15. The method for hydrostatically testing a pipeline carrying ecology degrading or dangerous fluid products which comprises:
injecting water into the pipeline in place of the fluid product,
transferring the water to a predetermined point by pumping additional liquid into the pipeline,
discontinuing the pumping of liquid into the pipeline and freezing a portion of the water to form an ice plug in the pipeline,
pumping additional liquid into the pipeline adjacent the ice plug to raise the pressure of the liquid to a predetermined test pressure, and
maintaining the test pressure for a test period while monitoring the test pressure.

16. The method of claim 15 further characterized by establishing a back pressure on the other side of the ice plug during the test period, and
monitoring the back pressure during the test period.

17. The method for modifying or repairing a central section of a welded pipeline which is transporting ecology degrading or dangerous fluid products over substantial distances which comprises:
pumping a substantial volume of water into a pipeline to form a water slug filling a portion of the length of the pipeline,
transferring the water slug to straddle a section of the pipeline to be modified or repaired by pumping additional fluid products into the pipeline behind the water slug,
isolating the portion of the water slug straddling the section of the pipeline to be modified or repaired by freezing at least one section of the water slug on each side of the central section to form an ice plug on each side of the central section, and penetrating the pipeline filled with the isolated portion of the water slug to perform the modification or repair.

18. The method for modifying or repairing a central section of a welded high pressure pipeline which is transporting ecologically degrading or dangerous fluid hydrocarbon products over substantial distances which comprises:

pumping a substantial volume of water at an inlet point into a pipeline already containing fluid hydrocarbon to form a water slug filling a portion of the pipeline separate from the fluid hydrocarbon, pumping additional fluid hydrocarbon into the pipeline at the inlet point separate from both the water slug and the fluid hydrocarbon already in the pipeline to force the water slug and the hydrocarbon already in the pipeline toward an outlet point, transferring the water slug to a central section of the pipeline to be modified or repaired by pumping additional fluid hydrocarbon into the pipeline at the inlet point until the water slug straddles the section of the pipeline to be modified or repaired, isolating the portion of the water slug straddling the central section of the pipeline to be modified or repaired by freezing at least one section of the water slug to form an ice plug and closing the pipeline at a point within the water slug and spaced on the other side of the section from the water slug, and penetrating the central section of the pipeline filled with the isolated portion of the water slug with a tool and then performing the modification or repair.

* * * * *

UNITED STATES PATENT OFFICE
CERTIFICATE OF CORRECTION

Patent No. 3,827,282                    Dated August 6, 1974

Inventor(s) Beryle D. Brister

It is certified that error appears in the above-identified patent and that said Letters Patent are hereby corrected as shown below:

Column 1, line 17, delete "plates" and substitute therefor --plants--;

Column 4, line 61, delete "an" and substitute therefor --and--;

Column 5, line 18, after "94", insert --and 96,--;

Signed and sealed this 19th day of November 1974.

(SEAL)
Attest:

McCOY M. GIBSON JR.　　　　　　　C. MARSHALL DANN
Attesting Officer　　　　　　　　Commissioner of Patents